US009803714B2

(12) United States Patent
Rubitzko et al.

(10) Patent No.: US 9,803,714 B2
(45) Date of Patent: Oct. 31, 2017

(54) HYDRAULIC SYSTEM

(71) Applicant: Rausch & Pausch GmbH, Selb (DE)

(72) Inventors: Tim Rubitzko, Döhlau (DE); Frank Lauterbach, Höchstädt (DE)

(73) Assignee: Rausch & Pausch GmbH, Selb (DE)

( * ) Notice: Subject to any disclaimer, the term of this patent is extended or adjusted under 35 U.S.C. 154(b) by 104 days.

(21) Appl. No.: 14/710,140

(22) Filed: May 12, 2015

(65) Prior Publication Data
US 2015/0330474 A1  Nov. 19, 2015

(30) Foreign Application Priority Data

May 16, 2014  (DE) .................. 10 2014 209 387

(51) Int. Cl.
*F16K 31/12* (2006.01)
*F16F 9/43* (2006.01)
(Continued)

(52) U.S. Cl.
CPC .............. *F16F 9/43* (2013.01); *B60G 17/08* (2013.01); *F15B 21/005* (2013.01); *F16F 9/3271* (2013.01); *F16F 9/54* (2013.01); *F16K 11/0712* (2013.01); *B60G 2800/012* (2013.01); *F15B 11/0413* (2013.01); *F15B 2211/40584* (2013.01); *F15B 2211/50545* (2013.01); *F15B 2211/50563* (2013.01); *F15B 2211/5156* (2013.01); *F15B 2211/5157* (2013.01);
(Continued)

(58) Field of Classification Search
CPC ....... F15B 11/0423; F15B 21/055; F16F 9/43; F16F 9/54; B60G 17/08; Y10T 137/86775; F16K 11/0712
See application file for complete search history.

(56) References Cited

U.S. PATENT DOCUMENTS 2,984,261 A  5/1961 Kates
4,597,584 A  7/1986 Hanser et al.
(Continued)

FOREIGN PATENT DOCUMENTS

DE  4030159 A1 * 3/1992 ........... G05D 7/0126
DE  10049827 A1  6/2001
(Continued)

OTHER PUBLICATIONS

European Search Report dated Oct. 20, 2015, in connection with corresponding EP Application No. 15166706.0 (3 pgs.).
(Continued)

*Primary Examiner* — Jessica Cahill
(74) *Attorney, Agent, or Firm* — Maier & Maier, PLLC

(57) ABSTRACT

In a hydraulic system which is biased to a minimum system pressure using a bias valve or other flow obstruction disposed in a tank line, there is provided in a bypass line to the bias valve an evacuating and filling valve through which the hydraulic system is first evacuatable and subsequently fillable with a hydraulic fluid. The valve closes the bypass when a differential pressure overcomes a preadjusted force of a spring element. For this purpose, the valve possesses a displaceably mounted valve body with an integrated throttle and a seal face which closes a through opening when the valve body is shifted against the bias force of the spring element due to the pressure difference.

17 Claims, 6 Drawing Sheets

Figure 1:
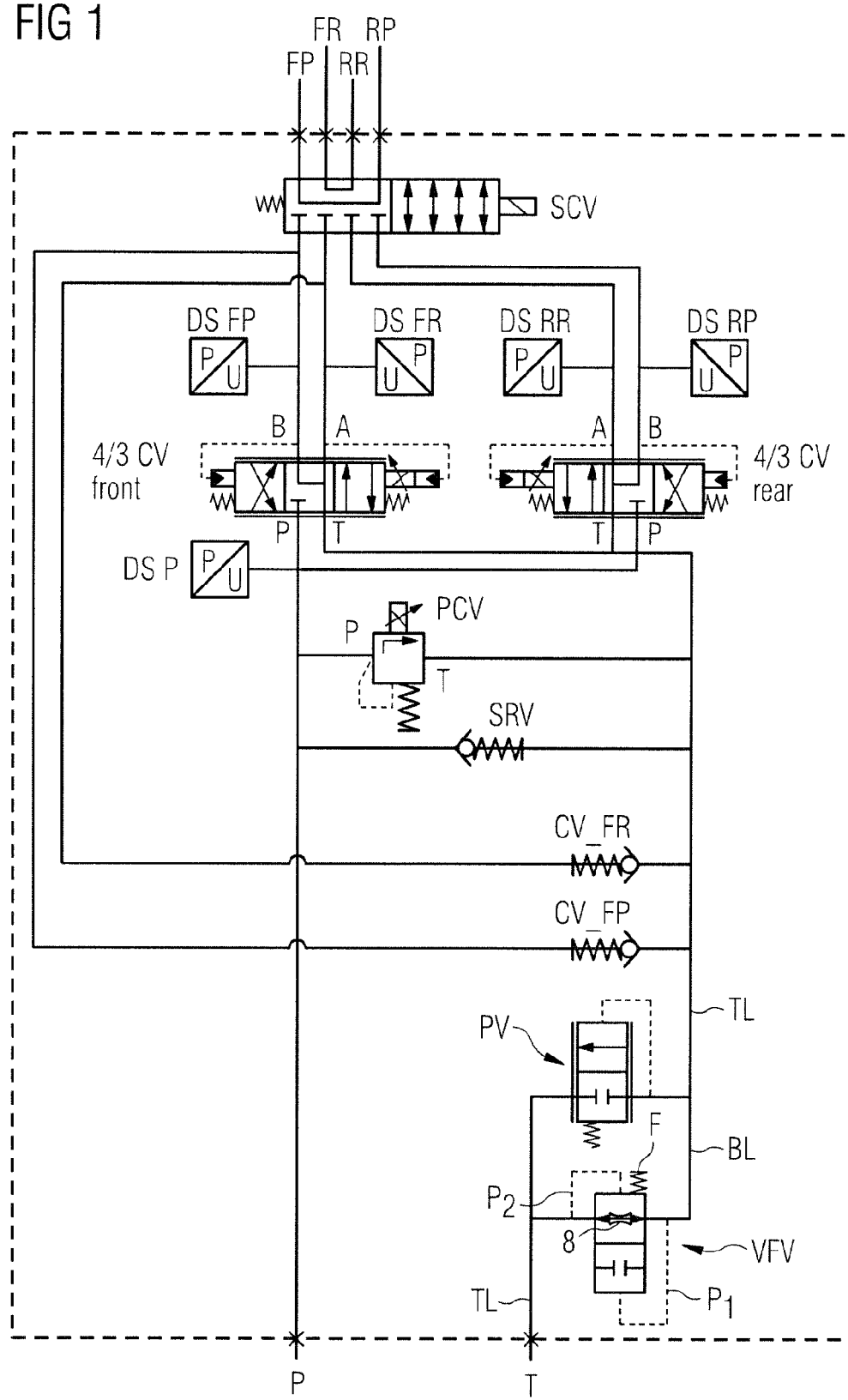

(51) Int. Cl.
*B60G 17/08* (2006.01)
*F16F 9/32* (2006.01)
*F16F 9/54* (2006.01)
*F16K 11/07* (2006.01)
*F15B 21/00* (2006.01)
*F15B 11/04* (2006.01)
*F16K 15/02* (2006.01)

(52) U.S. Cl.
CPC ... *F15B 2211/613* (2013.01); *F16F 2228/066* (2013.01); *F16K 15/025* (2013.01); *Y10T 137/86775* (2015.04)

(56) References Cited

U.S. PATENT DOCUMENTS

| | | | |
|---|---|---|---|
| 4,746,133 A | 5/1988 | Hanser et al. | |
| 5,048,295 A * | 9/1991 | Hoscheler | F15B 11/0445 60/459 |
| 7,413,235 B2 * | 8/2008 | Pausch | B60J 7/0573 296/107.01 |
| 2011/0158830 A1 * | 6/2011 | Cheong | E02F 9/2232 417/279 |
| 2014/0190158 A1 * | 7/2014 | Uenishi | F15B 11/08 60/459 |

FOREIGN PATENT DOCUMENTS

| | | |
|---|---|---|
| DE | 102009048474 B3 | 7/2011 |
| GB | 675701 A | 7/1952 |
| WO | 2007020052 A1 | 2/2007 |
| WO | 2008/019863 A1 | 2/2008 |

OTHER PUBLICATIONS

German Search Report dated Jan. 27, 2015, from corresponding German Application No. 10 2014 209 387.2; 2 pgs.

* cited by examiner

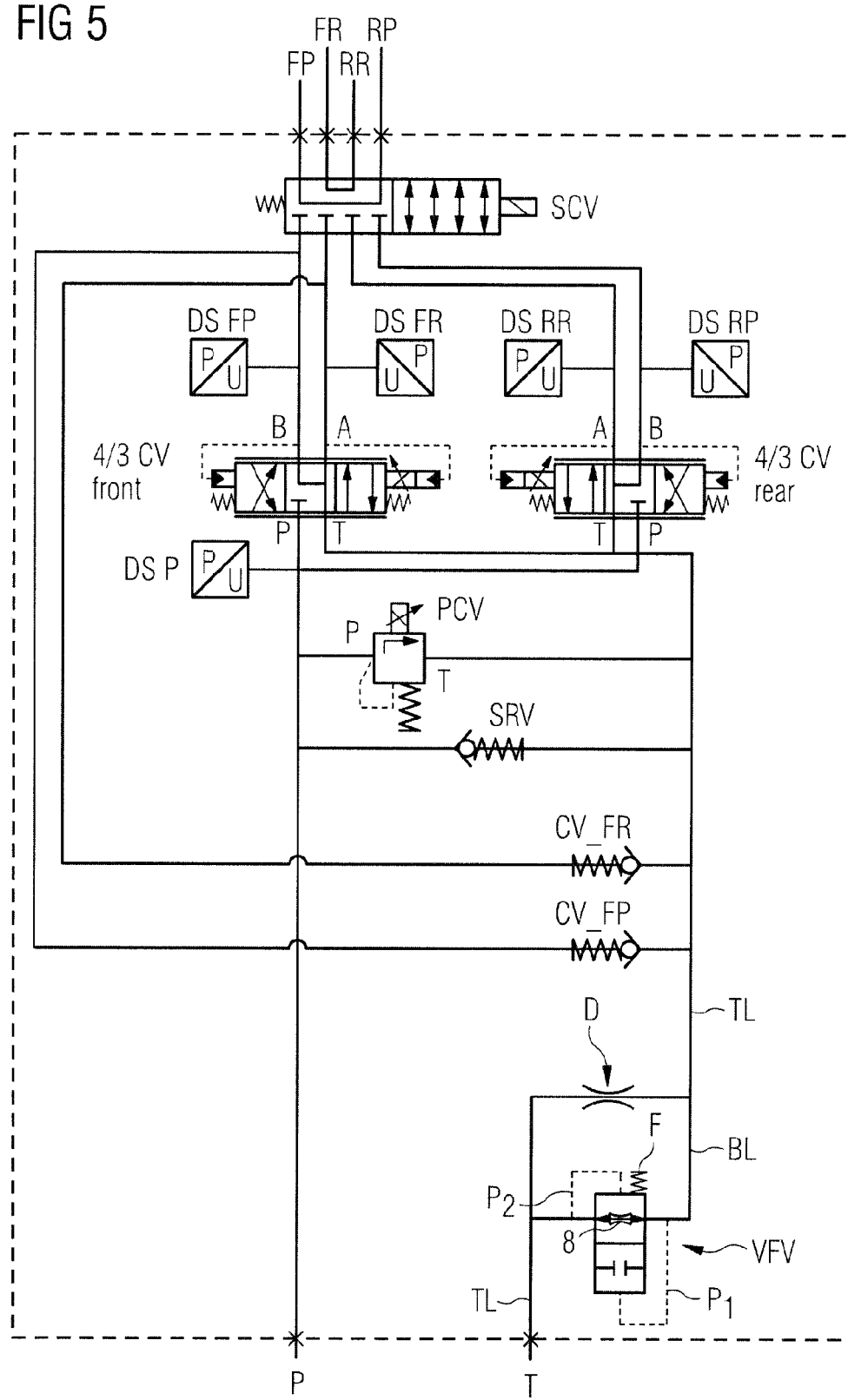

HYDRAULIC SYSTEM

This invention relates to a hydraulic system, in particular a hydraulic system as is used in a chassis control system for anti-roll stabilization of an automobile, and to a valve for use in such a hydraulic system.

Hydraulic systems are in some cases "biased" at a pressure, so that a minimum pressure prevails in the hydraulic system during operation. This makes the system react faster to influences acting on actuators or other components of the hydraulic system from outside. Thus biased hydraulic systems are also used in chassis control systems for anti-roll stabilization of automobiles. Customary bias pressures lie between 10 and 20 bar.

When such a hydraulic system is put into operation, the system is usually first evacuated and subsequently filled with the hydraulic medium, normally an oil. For this purpose, a vacuum is first applied e.g. to the tank port of the appurtenant valve block in order to remove the air from the hydraulic system, and the hydraulic system is then filled with the hydraulic fluid via the same port.

This evacuating and filling operation is problematic in biased hydraulic systems, because for maintaining the bias pressure there is usually provided in the tank line of the valve block a bias valve which only opens to the tank as of a certain system pressure. As mentioned, said pressure conventionally lies between 10 and 20 bar and thus considerably above a differential pressure of 1 bar, which would be maximally reachable by applying a vacuum to the tank port of the valve block when evacuating the system. The system can hence not be evacuated via the bias valve. Filling the system with hydraulic fluid is also blocked by the bias valve.

To nevertheless enable the evacuating and filling of the system via the tank port of the valve block, the following two alternative procedures are customary.

According to the first procedure, there is provided on the valve block a separate access via which the system can be evacuated and filled while bypassing the bias valve. Said access is closed mechanically after filling. This solution has the disadvantage that a new filling in the case of repair is not readily possible.

Figure 2:
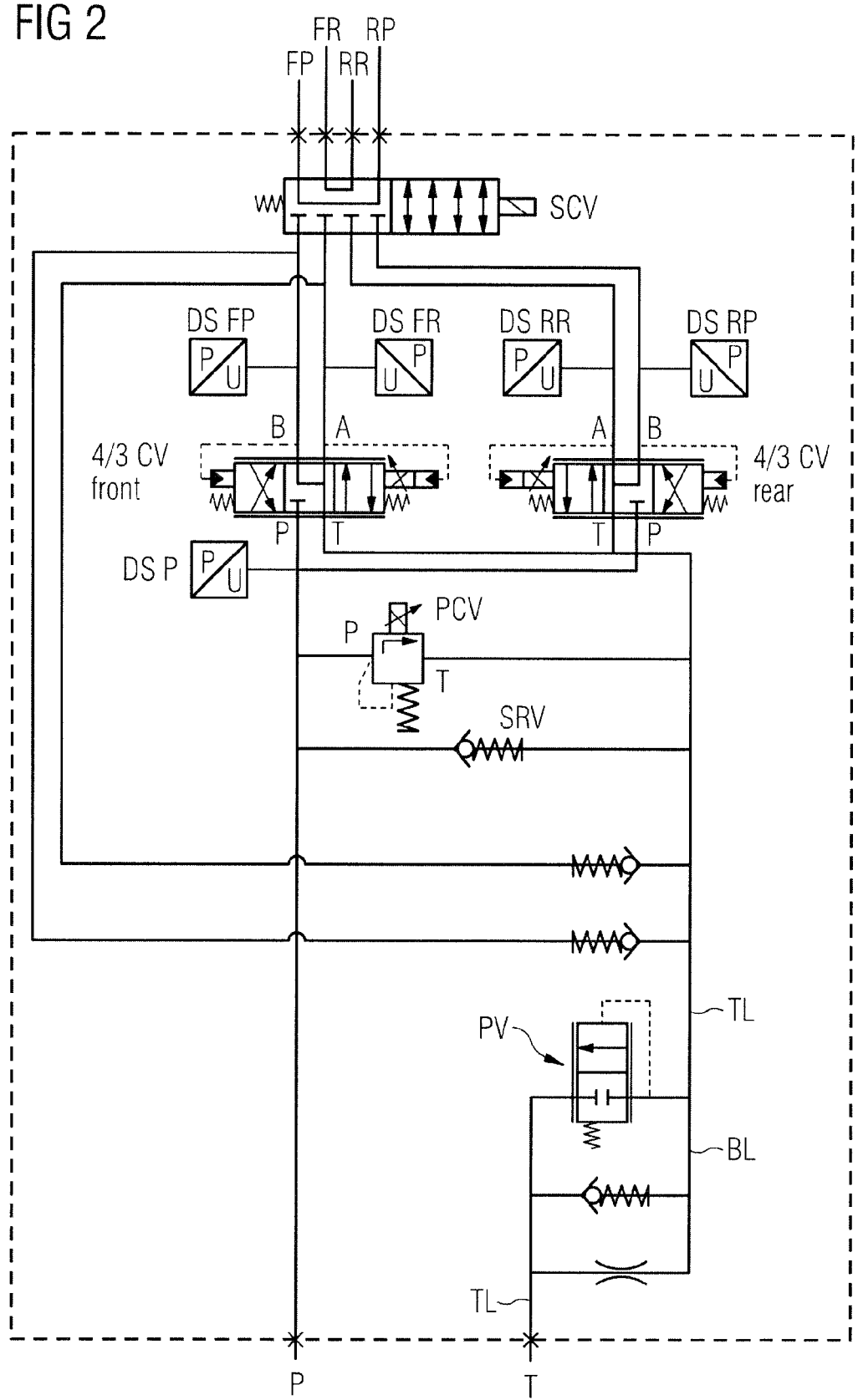

According to the second procedure, which enables a filling any time also in the case of repair, there is instead provided a bypass to the bias valve in the tank line of the valve block. In the bypass there is disposed a valve device via which the hydraulic system can be evacuated and filled. Said valve device consists of a throttle and a check valve connected parallel thereto which opens when pressurized on the tank side and otherwise closes. When the system is evacuated via the tank port of the valve block a vacuum in the system is drawn through the throttle. Subsequently, the hydraulic medium is urged into the system through the check valve. A corresponding valve-block hydraulic circuit diagram is shown in FIG. 2.

The disadvantage of this solution is that it destroys the advantage achieved with the bias valve, because at smaller volume flows or relatively low system pressures the percentage share of volume flow that flows off via the throttle becomes so great that the bias pressure drops.

The object of the present invention is hence to propose a hydraulic system, for example in the form of a valve block, that enables a new filling of the system in a simple manner and avoids the above-mentioned disadvantages of the prior art.

This object is achieved according to a preferred embodiment of the invention by a hydraulic system having the features of claim 1 and a valve for the hydraulic system having the features of claim 11.

Accordingly, a hydraulic system according to a preferred embodiment of the invention comprises a tank line and a flow obstruction in the tank line. The tank line can connect e.g. one or more hydraulic valves of the system to a tank. In the tank line there can be disposed e.g. the previously described bias valve, which is so adjusted or adjustable that it opens a flow path in the direction of the tank when a pre-specified hydraulic pressure is reached or exceeded on the bias valve on the hydraulic-valve side in the tank line. Said hydraulic pressure is then the hydraulic pressure at which the system can be biased in order to obtain a faster reaction to external influences on actuators or other components of the system. Instead of such a bias valve, there can be installed in the tank line, alternatively or connected parallel thereto, a baffle or throttle or other flow obstruction having an equivalent effect. During operation of the system, throttles and baffles effectuate a pressure drop via the throttle or baffle and thus a pressure buildup before the throttle or baffle in the flow direction, said buildup being dependent on the current volume flow, however, in contrast to the bias valve.

Similarly to the above-described prior art, the hydraulic system according to this preferred embodiment of the invention also has a valve device for evacuating and filling the hydraulic system provided in the hydraulic system as a bypass to the flow obstruction, through which device the hydraulic system can, on the one hand, be evacuated when air is present in the hydraulic system and a negative pressure is produced on the valve device on the tank side, and through which the hydraulic system, on the other hand, is fillable with hydraulic fluid from the tank side of the valve device.

The hydraulic system according to this preferred embodiment of the invention differs from the prior art in that the valve device closes a flow through the bypass when a first hydraulic pressure exists on the valve device on the hydraulic-system side, and a second hydraulic pressure which is smaller than the first hydraulic pressure on the tank side. This means that as of a pre-specified pressure difference which is defined by the first and second hydraulic pressures, the flow through the bypass is closed by means of the valve device. As long as said pressure difference is not reached the flow through the bypass remains open, or as soon as said pressure difference is undershot the valve device opens the flow through the bypass.

This differential-pressure solution offers different functions and advantages upon the evacuation and after the filling of the system. First of all, the system can be evacuated via the bypass and through the valve device as long as the differential pressure is not reached with the negative pressure applied on the tank-port side of the valve device in comparison to the (air) pressure existing in the tank line on the hydraulic-valve side of the valve device. Since the (air) pressure existing on the hydraulic-valve side amounts to at most 1 bar upon the evacuation operation and decreases continuously during the evacuation operation, one is on the safe side when the differential pressure pre-specified by the valve device at which the valve device closes the flow is adjusted to at least 1 bar, preferably to slightly more than 1 bar, for example 1.2 bar. Then the hydraulic system can be vented at maximum negative pressure of up to −1 bar and accordingly at maximum speed.

However, speedy venting is also possible at lower differential pressures, for example 0.5 bar, whereby the venting speed can be increased by raising the differential pressure, however. This means for example that when the valve device is adjusted to a differential pressure of 0.5 bar, there is first applied upon the evacuation operation a negative pressure at 0.5 bar which decreases to a negative pressure to 0 bar (vacuum) in proportion as the air pressure in the system decreases from 1 bar to 0.5 bar, and is then held at 0 bar until a vacuum is drawn in the total system.

When the system has later been filled with a hydraulic medium, for example a hydraulic oil, the valve device closes the flow through the bypass during operation of the hydraulic system as soon as the pressure in the tank line on the hydraulic-valve side of the valve device lies above the pressure on the tank-port side by the pre-specified differential pressure. The tank line is then only opened again, e.g. via the parallel-connected bias valve, when the system pressure overcomes the substantially higher bias force of the bias valve. Accordingly, the valve device actually always remains closed during operation once the differential pressure pre-specified in the valve device has been exceeded. As a result, this has the consequence that the bias pressure produced in the system by the parallel-connected bias valve is maintained even in the case of small volume flows. Much the same holds when throttles or baffles are provided in the tank line as a flow obstruction, instead of the bias device. The valve device can be adjusted to such a low differential pressure, e.g. 0.1 bar, that the pressure drop via the throttles or baffles of the flow obstruction becomes so low that the valve device opens only as of very low flows.

However, the bias pressure of a bias valve also decreases due to leakage currents when the hydraulic system is out of operation for a certain time. This has the consequence that whenever the hydraulic system is put into operation again, that is, at each new start of the pump of the hydraulic system, hydraulic medium first escapes via the bypass through the valve device to the tank until the pressure difference to which the valve device is adjusted and at which the valve device blocks any further flow is reached. Until then the valve device counteracts the pressure buildup in the system. The same holds of course when the flow obstruction in the tank line is not formed by a bias valve, but by a throttle or baffle. To minimize this unwanted effect, it may be advantageous to choose the differential pressure to which the valve device is adjusted as low as possible, for example at 0.2 bar or preferably only 0.1 bar. This also means that the system can only be evacuated at this low differential pressure at most. However, this disadvantage must then be accepted.

The hydraulic system having the bias valve as well as the valve device disposed in the bypass can be integrated for example in a valve block.

The previously described functions of the valve device can be realized in diverse ways, and the valve device can thus have electronic, magnetic, electromagnetic, electromechanical or purely mechanical components. Preferably, the valve device consists of purely mechanically acting components which are controlled only by the differential pressure. However, by way of an exception it can be provided that components for adjusting the differential pressure are for example electromechanical or electromagnetic or purely magnetic.

Preferably, the valve device comprises at least one throttle or baffle, and the flow through the bypass closes automatically when the flow volume through the throttle or baffle becomes so great that there occurs via the throttle or baffle a pressure loss in the flow that corresponds to or exceeds the differential pressure adjusted in the valve device.

This can be simply realized mechanically when the throttle or baffle is formed by a displaceably mounted spool. The spool can for example possess one or more axial through openings which act as a baffle or throttle when the spool is traversed by flow. Alternatively or additionally, the spool can have circumferential grooves in the longitudinal direction or direction of shift of the spool which, together with the spool guide, form the baffle or throttle. It is equally possible that, instead of the spool, the spool guide has such grooves in the longitudinal direction, while the spool's circumferential area is smooth in contrast. Both the spool and the spool guide can of course also have corresponding grooves.

By means of the displaceable spool the flow through the bypass can then be closed directly or indirectly. According to an especially simple embodiment, the flow through the bypass can be closed by means of one or more end faces of the spool, in particular when the flow is effected through axial through openings of the valve device. Alternatively, it is also possible, however, to close for example radial through openings of the valve device by means of circumferential areas of the spool in order to stop the flow through the bypass. In any case the displaceably mounted spool preferably possesses one or more seal faces for closing the flow through the bypass.

To adjust the valve device to the pre-specified differential pressure as of which the valve device closes the flow through the bypass, the valve device preferably comprises a bias device which is preferably embodied by a mechanical bias device, in particular a mechanical spring element. The bias device can serve for example to exert a bias force on a valve body, in particular the above-mentioned displaceable spool, and to thus urge the valve body into an open position in which the valve body releases a flow path. When a pressure difference existing on the valve device produces a force opposing the bias force and overcoming said bias force, the valve body shifts against the bias force of the bias device into a closed position in which the flow path is closed. As previously explained, said pressure difference can be produced by the valve body being configured as a displaceable spool with an integrated baffle or throttle, so that when the baffle or throttle is traversed by flow a pressure loss in the flow occurs which urges the spool into the closed position.

Figure 1A:
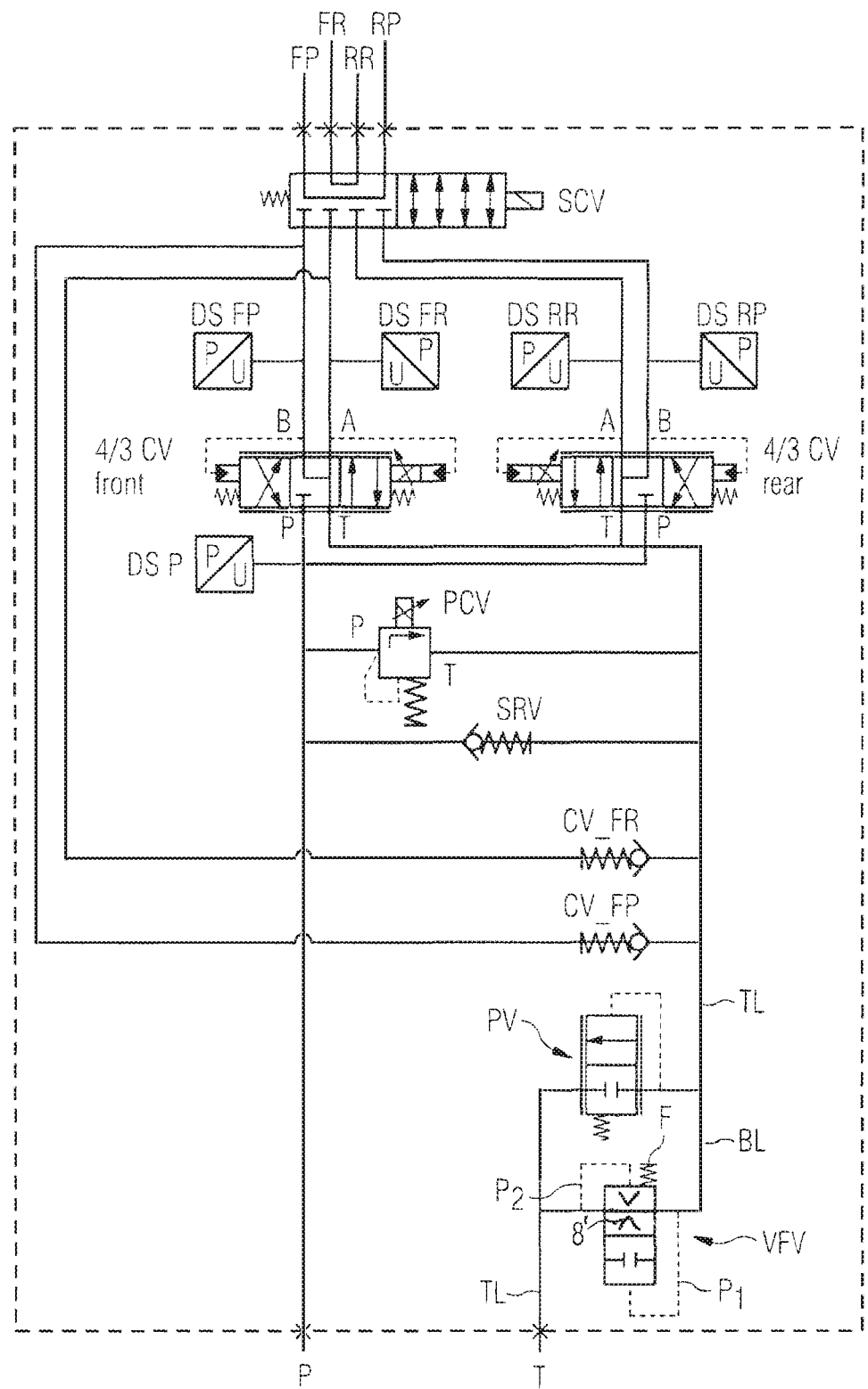
Figure 3:
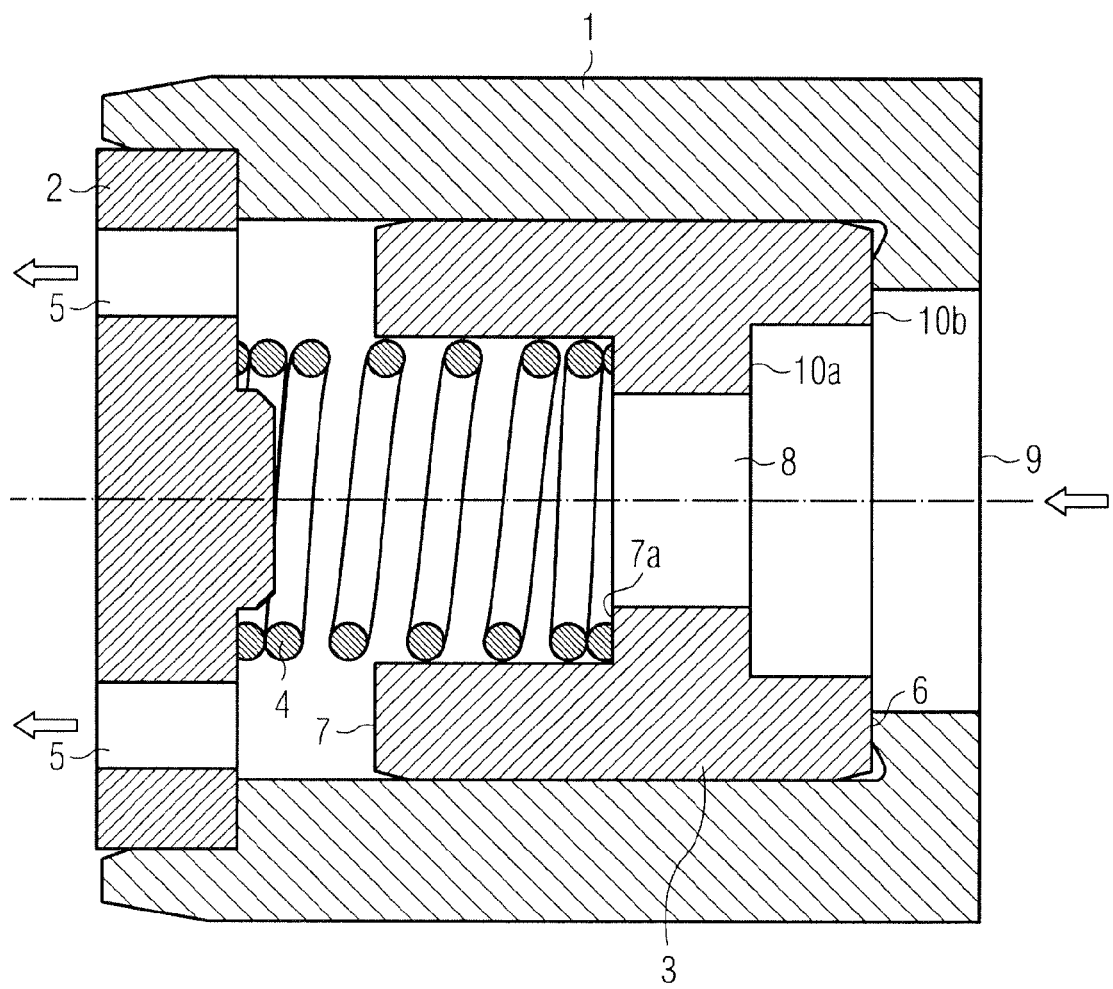
Figure 4:
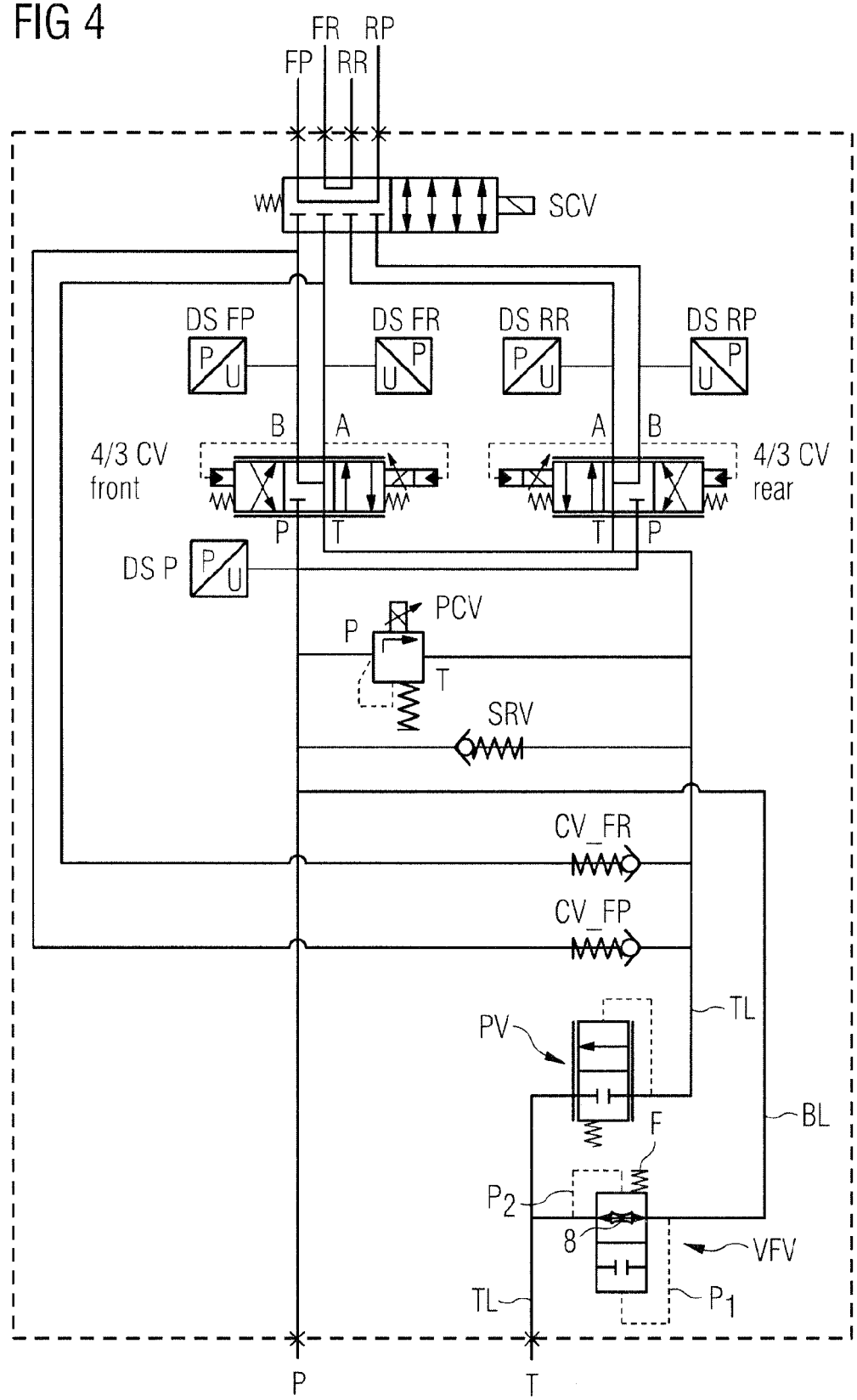

Hereinafter the invention will be explained more closely by way of example with reference to the accompanying drawings. Therein are shown:

FIG. 1 the circuit diagram of a valve block having a valve device (VFV) according to a first preferred exemplary embodiment of the invention, FIG. 1A the circuit diagram of a valve block having a valve device (VFV) according to an alternative preferred exemplary embodiment of the invention, FIG. 2 the hydraulic circuit diagram from FIG. 1 which is not in accordance with the invention, however, and has instead of the valve device (VFV) a throttle and a check valve, FIG. 3 a hydraulic valve as a special exemplary embodiment for the valve device (VFV) in FIG. 1, FIG. 4 the circuit diagram of a valve block having a valve device (VFV) according to a second exemplary embodiment of the invention, and FIG. 5 the circuit diagram of a valve block having a valve device (VFV) according to a third exemplary embodiment of the invention.

FIG. 1 shows a hydraulic circuit diagram for a hydraulic system according to a first exemplary embodiment, namely, the circuit diagram of a valve block whose boundaries are indicated by a dashed frame. Said hydraulic system can be part of a larger hydraulic system, and the larger hydraulic system can comprise for example a pump and a tank as well as actuators and the like.

The valve block represented by way of example in FIG. 1 belongs to a hydraulic chassis control system with which e.g. an anti-roll stabilization of a vehicle can be realized. For this purpose, the valve block possesses in addition to the pressure port P leading to the pump, and the tank port T leading to the tank, a plurality of actuator ports. For example, the ports FP and FR can lead to the front axle of the chassis, and the ports RP and RR to the rear axle thereof. Should fewer actuators or axles be actuated, two lines are accordingly omitted in each case, and for more actuators or axles there are two lines more in each case.

For pressurizing each chassis axle or the appurtenant pressure and return lines, there is provided in the valve block a hydraulic valve, specifically a 4/3 way valve "4/3 CV front" for the front axle, and a 4/3 way valve "4/3 CV rear" for the rear axle. Pressure sensors DS are respectively provided on the pump line which connects the pump port to the 4/3 way valves, and on the respective port lines A and B which lead from the 4/3 hydraulic valves to the pressure and return lines FP, FR, RP, RR. Through suitable actuation of the 4/3 way valves in dependence on the pressures measured by means of the pressure sensors DS, the pressure distribution in the chassis can be regulated very exactly and fast.

Apart from the bias valve PV and evacuating and filling valve VFV described more closely hereinafter, the further valves represented in the hydraulic circuit diagram are customary and familiar to the person skilled in the art, hence not requiring any more detailed explanation.

The bias valve PV opens only as of a pre-specified pressure, which can be pre-specified for example by means of a spring element having the desired spring force and spring stiffness. In the represented exemplary embodiment, it is a proportional valve. Accordingly, the bias valve PV opens of as the preadjusted pressure, and the cross section of flow of the bias valve PV increases further with increasing pressure. By means of the bias valve PV there can thus be preadjusted in the hydraulic system a pressure that at least prevails at any time during operation of the hydraulic system. A flow-off of the hydraulic medium out of the hydraulic system into the tank only comes about at higher pressures. This means that, with a pump that can be operated at a pressure between 0 bar and 200 bar, only a working range of 10 bar to 200 bar is effectively utilizable, because no volume flows can be generated in the hydraulic system at pressures under 10 bar due to the bias valve PV. The importance of the bias valve PV consists in that the hydraulic system can react to external influences on the actuators faster.

Putting the hydraulic system into operation for the first time initially requires filling the system with a hydraulic medium, normally a hydraulic oil. This is effected via the tank port T. For this purpose, a vacuum in the system is first drawn via the tank port T, and subsequently the hydraulic medium urged into the hydraulic system via the same tank port T. This can be effected at a low pressure of for example 3 bar for accelerating the filling operation. Because the bias valve PV blocks the tank line both upon the evacuation operation and upon the filling operation, there is provided in the tank line TL a bypass line BL bypassing the bias valve PV in which line the evacuating and filling valve VFV is disposed via which the evacuation of the system and the filling of the system are effected.

As the symbol represented in FIG. 1 for the evacuating and filling valve VFV indicates, the valve VFV is embodied in this preferred exemplary embodiment by a 2/2 way valve. In a first valve position represented in FIG. 1, the two ports of the valve VFV are connected, and the flow through the bypass BL is effected through a throttle or baffle 8 in the valve VFV. Through the spring bias of a spring element F the valve is urged into this open valve position. In a second position of the valve VFV, which is not represented in FIG. 1, the two ports of the valve VFV are mutually separated. Furthermore, a pressure difference prevailing in the bypass line BL acts on the valve VFV such that the pressure $p_3$ existing on the tank-port side urges the valve VFV in the opening direction, and the pressure $p_2$ existing on the hydraulic-valve side in the closing direction. When the pressure $p_2$ on the hydraulic-valve side is greater than the pressure $p_3$ on the tank-port side, namely, so much greater that the bias force of the spring element F is also overcome, then the valve VFV moves into its closed position. Such a pressure difference comes about when the baffle or throttle 8 of the valve VFV is traversed by flow at a sufficiently great volume flow. As of a certain pump output or volume flow delivery of the pump, the valve VFV thus closes the flow through the bypass line BL automatically.

Now viewing the situation of evacuating the hydraulic system via the tank port T through the valve VFV, a relatively great volume flow can be removed through the valve VFV and the tank port T due to the low density of air without the valve VFV closing. For example, the spring force F and the flow geometry of the throttle or baffle 8 can be so adjusted that the valve VFV closes at a pressure difference of 1.2 bar, and this pressure difference is only reached at an air flow volume of 90 l/min. When the valve VFV is traversed by flow of hydraulic oil in the same direction, the same pressure difference of 1.2 bar already comes about at a very low volume flow of e.g. only 4 l/min due to the much higher density of hydraulic oil. This means that a lot of air can be drawn out of the system comparatively fast without the valve VFV closing upon evacuation of the system, but in actual operation of the hydraulic system the system already closes at very low hydraulic-oil volume flows of only 4 l/min and then also remains closed as long as the pressure in the hydraulic system overcomes the bias force of the spring element F. However, since the pressure in the hydraulic system is always held at a higher level of for example 2 bar or 5 bar, normally even 10 or 20 bar, by means of the bias valve PV, this means that the evacuating and filling valve VFV always remains closed after the filling operation, when the latter has been effected at an accordingly high pressure, or at the latest after the actual initial operation due to the high system pressure. In particular, no leakage currents occur through the throttle or baffle 8 of the valve VFV, not even at low volume flows, in contrast to the prior art (throttle-check valve arrangement in FIG. 2).

FIG. 3 shows an example of a valve that can be used as an evacuating and filling valve VFV.

The valve VFV consists substantially of four members, namely, a housing consisting of two members 1 and 2, a valve body 3 displaceably mounted in the housing, which can have the form of a spool, and a bias element 4, here in the form of a spiral spring. In the outer housing member 1 the valve body 3 is guided in an axially displaceable manner. At an axial end of the outer housing member 1 the second housing member 2 is inserted in the first, outer housing member 1. The bias element 4 is supported at one end against the second housing member 2 and at its other end urges the valve body 3 away from the second housing member 2. In the pressureless state of the valve VFV represented in FIG. 3, axial through openings 5 in the second housing member 2 are open, so that a flow through the valve VFV is possible. In this position, the valve body 3 is supported against a stop 6 of the outer housing member 1.

The outer housing member 1 and the second housing member 2 can also be configured in one piece or be welded or screwed together or interconnected in another way. The spring element can in turn also be supported on a corresponding shoulder of the first housing member 1 instead of on the second housing member 2. The through openings 5 do not necessarily have to extend axially but can for example also extend radially or angularly to the axial displacement of the valve body 3. Also, it is not necessary that the bias force is produced by a spring element or an equivalent mechanical bias element. It can instead also be produced electromechanically or magnetically or electromagnetically, but is preferably produced purely mechanically, because the valve VFV, in its use as an evacuating and filling valve, is no longer utilized after the filling operation or only by way of an exception in cases of repair.

The essential point in the exemplary embodiment according to FIG. 3 is primarily that the through openings 5 are closable by shifting the valve body 3. In the represented exemplary embodiment, the through openings 5 are closed by means of the end face 7 of the valve body 3 when the valve body 3 is shifted into its opposite end position (not represented) against the bias force of the spring element 4.

This is where an essential property of the valve body 3 comes into play. The valve body has the throttle 8 already mentioned with reference to FIG. 1, which is embodied here by a central bore which possesses a considerably reduced cross-sectional area compared with the cross-sectional area of the entrance opening 9 of the valve VFV. The valve body 3 accordingly has, in the flow direction marked by arrows, hydraulic pressure faces 10a, 10b before the throttle 8 in the flow direction and hydraulic faces 7, 7a therebehind in the flow direction. When a pressure loss in the flow now occurs when the throttle 8 is traversed by flow in this flow direction, a differential pressure acts on the valve body 3 via the hydraulic faces 7, 7a and 10a, 10b, which urges the valve body 3 in the direction of the through openings 5 against the bias force of the spring element 4. As soon as the volume flow and thus the differential pressure is sufficiently great to overcome the bias force of the spring element 4, the valve body 3 moves into the closed position (not represented) in which the through openings 5 are closed. Since the spring force rises with the spring travel, the valve VFV actually only closes at a slightly higher pressure than that pressure at which the valve body begins to move in the direction of the through openings 5.

At the last moment of the shift of the valve body 3, that is, shortly before the valve body 3 closes the through openings 5 with its end face 7, the mutually opposing edges of the end face 7 and of the through openings 5 act in turn like a throttle or baffle. Due to the resulting elevated pressure loss in the flow, the end face 7 is sucked onto the through openings 5 and closes them reliably.

As shown in FIG. 1A, instead of the throttle 8, a baffle 8' can also be provided in the valve body 3, which causes a pressure loss in the flow when traversed by flow just like a throttle. Moreover, it is possible to integrate into the valve body 3, instead of a throttle or baffle, a plurality of throttles or baffles or both throttles and baffles. The throttles and baffles can also be realized on the circumference of the valve body 3 in interaction with the outer housing member 1. These or similar constructional changes on the valve VFV do not alter the basic construction principle.

When such a valve VFV is inserted into a hydraulic system according to the hydraulic circuit diagram from FIG. 1A, namely, into the bypass line BL, the valve VFV and thus also the flow through the bypass line BL is closed as soon as there flows through the baffle 8' of the valve body 3 a volume flow that causes a sufficiently great pressure loss via the throttle 8 to shift the valve body 3 against the bias force of the spring element 4 into the end position (not represented) in which the through openings 5 of the valve VFV are closed and thus a flow through the bypass line BL is blocked. However, a relatively high air volume flow can be drawn through the valve VFV upon the operation of evacuating the hydraulic system via the same valve VFV, because air possesses a considerably lower density than conventional hydraulic media.

FIG. 4 represents a second exemplary embodiment which differs from the exemplary embodiment described with reference to FIG. 1 in that the bypass line BL does not merely bridge the bias valve PV, i.e. is not merely a bypass line to the tank line TL, but the bypass line BL is connected immediately to the pressure port P leading to the pump while bypassing all other components of the valve block. Accordingly, the bypass line BL could also branch off from any other line of the hydraulic system and lead to the tank line TL, assuming that the bypass line BL joins the tank line TL only behind the bias valve PV in the flow direction and thus in any case bridges the bias valve PV.

FIG. 5 shows a third exemplary embodiment which differs from the first exemplary embodiment described with reference to FIG. 1 only in that there is provided as a flow obstruction in the tank line TL, instead of the bias valve PV, a baffle or throttle D which is bridged by the bypass line BL with the evacuating and filling valve VFV integrated therein. As of a certain volume flow through the baffle or throttle D, such a high pressure loss arises via the baffle or throttle D that the differential pressure pre-specified in the valve VFV is reached and exceeded, so that the valve VFV closes automatically.

The bias valve PV can of course be replaced by a baffle or throttle D in the exemplary embodiment according to FIG. 4 as well.

The invention claimed is:

1. A hydraulic system comprising:
a tank line with a tank port and a bias valve in the tank line, wherein the bias valve is so adjusted or adjustable that it opens a flow path in a direction towards the tank port when a pre-specified hydraulic pressure is reached or exceeded on the bias valve in the tank line on a hydraulic system facing away from the tank port, there being provided in the hydraulic system as a bypass to the bias valve a valve device for evacuating and filling the hydraulic system,
through which the hydraulic system can be evacuated when a negative pressure is produced on the valve device on a tank side facing towards the tank port, and
through which the hydraulic system is fillable with hydraulic fluid from the tank side of the valve device,
wherein the valve device closes a flow through the bypass when a pre-specified pressure difference exists on the valve device, which is defined by a first hydraulic pressure on the hydraulic-system side, and by a second hydraulic pressure which is smaller than the first hydraulic pressure on the tank side.

2. The hydraulic system according to claim 1, wherein the valve device comprises a bias device which counteracts the closing of the flow through the bypass.

3. The hydraulic system according to claim 1, wherein the valve device is a 2-way valve.

4. The hydraulic system according to claim 1, wherein the valve device closes the flow through the bypass when the first hydraulic pressure lies more than 0.5 bar above the second hydraulic pressure.

5. The hydraulic system according to claim 1, wherein the valve device closes the flow through the bypass when the first hydraulic pressure lies 1 bar or more above the second hydraulic pressure.

6. The hydraulic system according to claim 1, wherein the valve device closes the flow through the bypass when the first hydraulic pressure lies less than 0.2 bar above the second hydraulic pressure.

7. The hydraulic system according to claim 6, wherein the valve device closes the flow through the bypass when the first hydraulic pressure lies less than 0.1 bar above the second hydraulic pressure.

8. The hydraulic system according to claim 1, wherein the bias valve is so adjusted or adjustable that it opens a flow path through the tank line when the hydraulic pressure on the hydraulic-system side of the bias valve reaches or exceeds 2 bar or more.

9. The hydraulic system according to claim 8, wherein the bias valve is so adjusted or adjustable that it opens a flow path through the tank line when the hydraulic pressure on the hydraulic-system side of the bias valve reaches or exceeds 10 bar or more.

10. The hydraulic system according to claim 1, wherein the valve device comprises at least one throttle or baffle and closes the flow through the bypass when the first hydraulic pressure exists on the at least one throttle or baffle on the hydraulic-system side, and the second hydraulic pressure on the tank side.

11. The hydraulic system according to claim 10, wherein the at least one throttle or baffle is formed by a displaceably mounted valve body.

12. The hydraulic system according to claim 11, wherein the displaceably mounted valve body comprises one or more seal faces for closing the flow through the bypass.

13. The hydraulic system according to claim 1, wherein the valve device comprises a valve which comprises:
 a flow path,
 a valve body shiftable in the flow path between a closed position and an open position, which closes the flow path in the closed position and releases it in the open position, with the valve body forming at least one baffle or throttle in the flow path, and
 a bias device which urges the valve body into the open position with a bias force, wherein the valve body possesses in the flow path at least one first hydraulic pressure face upstream with respect to the at least one baffle or throttle and at least one second hydraulic pressure face downstream with respect to the at least one baffle or throttle, so that when a pressure loss in the flow occurs when the at least one baffle or throttle is traversed by flow, a differential pressure acts on the valve body via the first and second hydraulic pressure faces, which moves the valve body into the closed position as of a differential pressure which overcomes the bias force of the bias device.

14. The hydraulic system according to claim 13, wherein the valve body is a spool axially displaceable along the flow path, and the at least one first hydraulic pressure face and the at least one second hydraulic pressure face are formed by end faces of the spool.

15. The hydraulic system according to claim 13, wherein the at least one baffle or throttle is formed by one or more axial through openings of the valve body.

16. The hydraulic system according to claim 13, wherein the flow path is closed by one or more end faces of the valve body in the closed position of the valve body.

17. The hydraulic system according to claim 13, wherein the hydraulic system is a hydraulic system of a chassis control system for anti-roll stabilization of a vehicle, in which the valve device is used as an evacuating and filling valve.

\* \* \* \* \*